(12) United States Patent
Wagner et al.

(10) Patent No.: US 12,454,985 B2
(45) Date of Patent: Oct. 28, 2025

(54) GEAR MOTOR, INCLUDING A GEAR MECHANISM DRIVEN VIA A CLUTCH BY AN ELECTRIC MOTOR

(71) Applicant: SEW-EURODRIVE GMBH & CO. KG, Bruchsal (DE)

(72) Inventors: Guido Wagner, Greensborough (AU); Aiden Schier, Weribee (AU)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 677 days.

(21) Appl. No.: 17/628,298

(22) PCT Filed: Jul. 2, 2020

(86) PCT No.: PCT/EP2020/025312
§ 371 (c)(1),
(2) Date: Jan. 19, 2022

(87) PCT Pub. No.: WO2021/013379
PCT Pub. Date: Jan. 28, 2021

(65) Prior Publication Data
US 2022/0252109 A1    Aug. 11, 2022

(30) Foreign Application Priority Data
Jul. 19, 2019   (DE) .......................... 102019005021.5

(51) Int. Cl.
*F16D 3/00*    (2006.01)
*F16D 3/84*    (2006.01)
(Continued)

(52) U.S. Cl.
CPC ............... *F16D 3/843* (2013.01); *F16P 1/02* (2013.01); *H02K 7/116* (2013.01); *F16D 2300/26* (2013.01)

(58) Field of Classification Search
CPC ........ F16D 3/843; F16D 2300/26; F16P 1/02; F02B 63/04; F02B 77/11; H02K 5/04; H02K 5/207; H02K 9/06
See application file for complete search history.

(56) References Cited

U.S. PATENT DOCUMENTS 1,232,953 A * 7/1917 Mills .......................... F16P 1/02
74/609
1,238,590 A * 8/1917 Starker ..................... F16P 1/02
74/609
(Continued)

FOREIGN PATENT DOCUMENTS

| CN | 113614413 A | 11/2021 |
| CN | 115280040 A | 11/2022 |

(Continued)

OTHER PUBLICATIONS

Rexnold (Year: 2016).*
(Continued)

*Primary Examiner* — Phutthiwat Wongwian
*Assistant Examiner* — Sherman D Manley
(74) *Attorney, Agent, or Firm* — Carter, DeLuca & Farrell LLP

(57) ABSTRACT

A gear motor includes a gear mechanism driven via a clutch by an electric motor. The clutch is at least partially enclosed by a protective part, and the protective part includes two cowl parts. The cowl parts are connected to one another and each cowl part includes grill openings, e.g., on their side facing toward the electric motor.

24 Claims, 5 Drawing Sheets

(51) Int. Cl.
*F16P 1/02* (2006.01)
*H02K 7/116* (2006.01)

(56) References Cited

U.S. PATENT DOCUMENTS

| | | | | |
|---|---|---|---|---|
| D244,020 | S * | 4/1977 | Hanson | D8/343 |
| 4,872,502 | A * | 10/1989 | Holzman | F16H 57/0415 |
| | | | | 165/47 |
| 6,073,517 | A * | 6/2000 | Pauwels | F04C 29/06 |
| | | | | 403/3 |
| 6,190,261 | B1 * | 2/2001 | Powell | F16P 1/02 |
| | | | | 464/170 |
| 6,241,618 | B1 * | 6/2001 | Doll | F16P 1/02 |
| | | | | 74/609 |
| 7,275,995 | B2 * | 10/2007 | Doll | F16P 1/02 |
| | | | | 464/176 |
| 7,520,816 | B1 * | 4/2009 | Brisk | F16D 3/843 |
| | | | | 464/172 |
| 8,025,577 | B2 * | 9/2011 | LaBarge, III | F16P 1/02 |
| | | | | 464/172 |
| 8,555,747 | B2 * | 10/2013 | Kant | F16H 57/033 |
| | | | | 74/606 R |
| 8,821,106 | B2 * | 9/2014 | Santhosh | F16D 1/076 |
| | | | | 415/176 |
| 9,404,416 | B2 * | 8/2016 | Kennedy | F02B 63/06 |
| 9,470,364 | B2 * | 10/2016 | Cocks | F16P 1/02 |
| 9,821,283 | B1 * | 11/2017 | Brough | A61J 3/10 |
| 10,428,877 | B2 * | 10/2019 | Bhardwaj | F16D 3/843 |
| 11,536,362 | B2 | 12/2022 | Kunik | |
| 11,885,406 | B2 | 1/2024 | Völker | |
| 2003/0216187 | A1 * | 11/2003 | Doll | F16P 1/02 |
| | | | | 464/176 |
| 2006/0144201 | A1 * | 7/2006 | Doll | F16P 1/00 |
| | | | | 83/13 |
| 2009/0264209 | A1 * | 10/2009 | LaBarge, III | F16D 3/841 |
| | | | | 464/171 |
| 2011/0290051 | A1 * | 12/2011 | Morgan | H02K 7/116 |
| | | | | 74/396 |
| 2014/0311283 | A1 * | 10/2014 | Cocks | F16P 1/02 |
| | | | | 74/608 |
| 2016/0312954 | A1 * | 10/2016 | Wei | F16D 3/843 |
| 2017/0307025 | A1 * | 10/2017 | Pederson | F16D 3/841 |
| 2018/0045359 | A1 * | 2/2018 | Lauer | F16M 5/00 |
| 2020/0173337 | A1 * | 6/2020 | Jochman | F02B 63/044 |
| 2020/0222734 | A1 * | 7/2020 | Wechsler | A62C 3/00 |
| 2023/0184175 | A1 * | 6/2023 | Gontla | F02K 3/06 |
| | | | | 60/773 |
| 2023/0213139 | A1 * | 7/2023 | Yoder | F04B 53/22 |
| | | | | 29/888.02 |
| 2024/0382786 | A1 * | 11/2024 | Wechsler | F04D 29/5806 |

FOREIGN PATENT DOCUMENTS

| | | |
|---|---|---|
| DE | 102004062465 A1 | 7/2006 |
| DE | 60033110 T2 | 11/2007 |
| EP | 109990 A2 | 5/2001 |
| EP | 3118476 A1 | 1/2017 |

OTHER PUBLICATIONS

International Preliminary Report on Patentability issued in corresponding International Application No. PCT/EP2020/025312, dated Jan. 25, 2022, pp. 1-8.
International Search Report issued in corresponding International Application No. PCT/EP2020/025312 dated Sep. 30, 2020, pp. 1-2, English Translation.

* cited by examiner

GEAR MOTOR, INCLUDING A GEAR MECHANISM DRIVEN VIA A CLUTCH BY AN ELECTRIC MOTOR

FIELD OF THE INVENTION

The present invention relates to a gear motor, which includes a gear mechanism driven via a clutch by an electric motor.

BACKGROUND INFORMATION

In certain conventional systems, a gear motor includes a gear mechanism driven by a motor.

An assembly having a protective unit for optical and/or visual inspection is described in German Patent Document No. 10 2004 062 465.

An adjustable protective device for a rotating shaft is described in German Patent Document No. 600 33 110.

A protective device for a roller of a scroll of a spinning mule is described in U.S. Pat. No. 1,232,953.

SUMMARY

According to an example embodiment of the invention, a motor includes a gear mechanism driven via a clutch by an electric motor, and the clutch is at least partially enclosed by a protective part that includes two cowl parts. The cowl parts are connected to one another and each includes grill openings, e.g., on their side facing toward the electric motor.

It is considered advantageous in this regard that a protective part is composed of two cowl parts and is therefore readily installable. This is because the two parts can be guided thereto from two directions and thus the protective part can be assembled in a simple manner. In addition, grill openings are provided, which do prevent human fingers from reaching through the cowl parts, but permit an airflow, e.g., with a low flow resistance.

Furthermore, it is considered advantageous that a turbo clutch is usable as the clutch, the cooling of which is ensured by the grill openings.

According to example embodiments, the two cowl parts are pressed against one another and/or connected in a formfitting manner by lever latches. It is considered advantageous that a formfitting connection of the cowl parts is provided by the lever catches, on the other hand, however, contact pressure can be effectuated upon closing and clamping of the lever catches.

According to example embodiments, a door part is respectively connected to one, e.g., each, of the cowl parts. It is considered advantageous that the door part alone can be folded open solely for inspection and the door part can be taken out for repair. Removal of the larger cowl parts is thus avoidable. This is considered advantageous because the protective part is not only produced by merely joining together the two cowl parts, but also has to be arranged touching the motor. For this purpose, the further tube parts are to be displaced by the respective oblong hole until touching occurs on the motor. The cowl parts have to be arranged toward the gearing mechanism such that the opening of the protective part discharging toward the gearing mechanism is located inside the air guiding cowl in the intermediate space between air guiding cowl and gearing mechanism. The alignment and adjustment work thus required during the installation and connection of the two cowl parts is thus avoidable.

According to example embodiments, a handle part is connected to the door part. It is considered advantageous that simplified handling is achievable. The handle part is usable during the rotation and during the transitional movement and thus simplifies the actuation. However, raising of the door part is also executable more readily during installation.

According to example embodiments, a handle part is connected to the cowl part. It is considered advantageous that simplified handling is achievable, e.g., during the installation. This is because the handle part is attached to the upper side and thus raising is executable precisely in the installation situation.

According to example embodiments, the motor shaft, e.g., the rotor, of the electric motor is guided through a recess of the protective part into the interior enclosed by the protective part, in which the protective part includes a collar protruding toward the electric motor, e.g., axially, which presses against the motor, e.g., the housing part of the motor. It is considered advantageous that the installation of the protective part takes place so that it touches the motor and thus human fingers can be prevented from reaching in toward a part rotating inside the protective part.

According to example embodiments, the collar is formed from a first tube segment fastened on the cowl part and a second tube segment. The first tube segment includes a radial through hole, through which a screw is guided, which protrudes through a through oblong hole arranged on the second tube segment. The oblong hole is, for example, aligned in the axial direction.

It is considered advantageous that an adjustment of the axial length of the collar, which is arranged in four parts, is provided by the second tube segment fastened over the oblong hole and thus a touching configuration of the protective part is provided. Each of the two cowl parts respectively has the collar which is formed from the respective first and second tube segment, in which each of the two tube segments is connected to a respective further tube segment.

According to example embodiments, the circumferential angle range covered by the first tube segment in the circumferential direction is 180°, and, for example, the circumferential angle range covered by the second tube segment in the circumferential direction is 180°. It is considered advantageous that the first tube segment, which is arranged on the first cowl part, together with the first tube segment, which is arranged on the second cowl part, form a complete tube, so that this tube thus formed completely encloses the motor shaft in the circumferential direction.

According to example embodiments, the door part is connected by a detachable pivot bearing to the cowl part. It is considered advantageous that the door part is alternately rotatable or can be pulled out translationally from the pivot bearing and is thus removable.

According to example embodiments, the pivot bearing includes a first and a second fitting part, in which the first fitting part is connected to the cowl part, and the second fitting part is connected to the door part. The first fitting part includes a pin, which is received and rotatable in a recess, e.g., a pocket hole, of the second fitting part, and the pin is aligned in the axial direction, e.g., the longest extension of the pin is aligned in the axial direction. It is considered advantageous that the pivot bearing is alternately for bearing a pivot movement and is alternately detachable by a translational movement.

According to example embodiments, the first cowl part and the second cowl part are made mirror symmetrical and/or structurally identical to one another. It is considered advantageous that a small number of parts is required for producing the gear motor.

According to example embodiments, the screw head of a screw passing through a recess of the door part presses the door part onto the cowl part, and the screw is screwed into a threaded bore of the cowl part. It is considered advantageous that the door part is securely connected to the cowl part during the operation of the gear motor.

According to example embodiments, an air guiding cowl at least partially encloses the gear mechanism, and the protective part includes a recess arranged on its side facing toward the gear mechanism, which is arranged radially inside the air guiding cowl. For example, the clear internal diameter of the recess is at least twice, e.g., at least five times, the diameter of the driving shaft of the gear mechanism. It is considered advantageous that the conveyed airflow is conducted through the intermediate space between the air guiding cowl and the gear mechanism and thus improved cooling of the gear mechanism is also achievable. For example, if a clutch having fan function or a fan is arranged inside the protective part, the cooling is improved.

According to example embodiments, the cowl part includes line arrangements, in which each line arrangement is formed from grill openings that are arranged in a line, e.g., a straight line, regularly spaced apart from one another at a distance a, and each pass through the cowl part. The line arrangements are aligned in parallel to one another and are spaced apart regularly from one another perpendicularly to the direction of the respective line, e.g., at the distance a. For example, each line arrangement has an offset, e.g., by half of the distance a, in relation to its respective closest adjacent line arrangement. Each of the grill openings is, for example, rectangular. It is considered advantageous that a flow through the cowl part with a low flow resistance is provided and nonetheless a high level of rigidity of the cowl part is obtainable.

According to example embodiments, the door part includes line arrangements, each of which is formed from grill openings which are arranged in a line, e.g., a straight line, regularly spaced apart from one another at a distance a, and each passes through the cowl part. The line arrangements are aligned in parallel to one another and are spaced apart regularly from one another perpendicularly to the direction of the respective line, e.g., at the distance a. Each line arrangement has an offset, e.g., by half of the distance a, in relation to their respective closest adjacent line arrangement. Each of the grill openings is, for example, rectangular. It is considered advantageous that a flow through the door part with a low flow resistance is provided and nonetheless a high level of rigidity of the door part is obtainable.

Further features and aspects of example embodiments of the present invention are explained in more detail below with reference to the appended schematic Figures.

DETAILED DESCRIPTION

Figure 1:
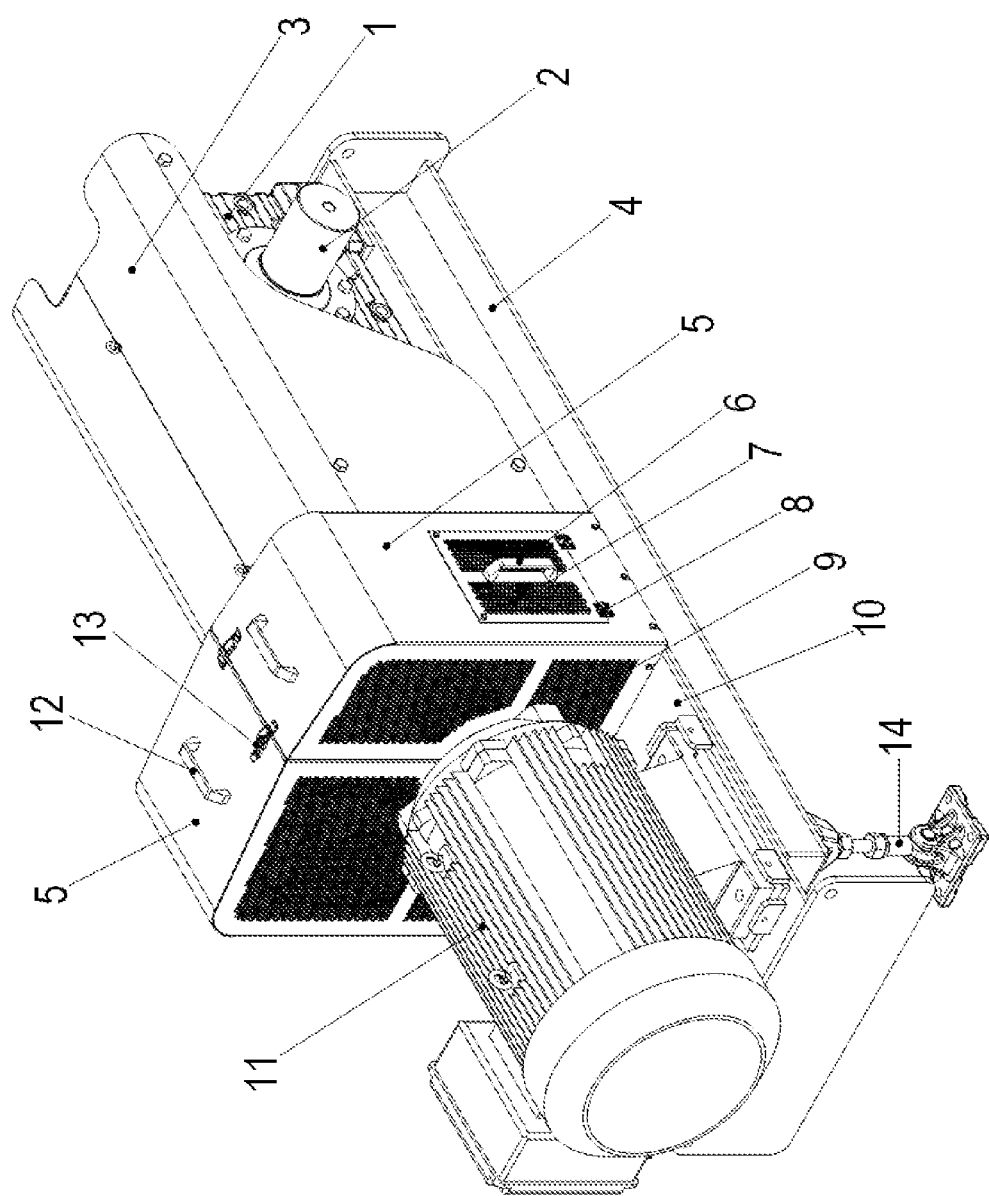
FIG. 1 is a perspective view of a gear motor that includes a protective part for a clutch.
Figure 2:
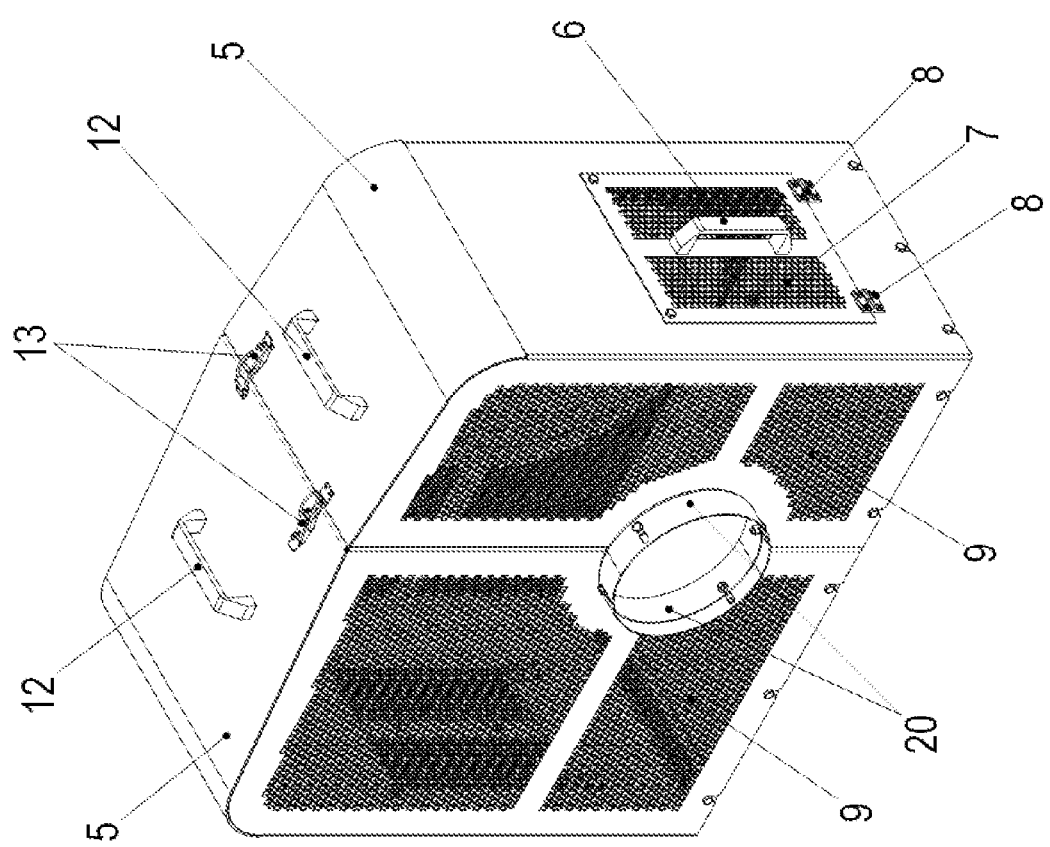
FIG. 2 is a perspective view of the protective part, which includes two cowl parts 5 and a door part 7.

As schematically illustrated in the Figures, the gear motor includes a gear mechanism 1, which is driven via a clutch by an electric motor 11.

The clutch includes rotating parts and is therefore enclosed by a protective part.

The gear mechanism includes an angular gear step on the drive side, e.g., driven by the clutch, which drives one or more parallel shaft gear steps, so that the output shaft 2 protrudes laterally out of the gear mechanism.

The gear mechanism 1 is installed on a first rocker part 4, which is connected to a second rocker part 10, on which the electric motor 11 is installed, which drives the gear mechanism 1 via the clutch.

The first rocker part 4 is supported via a support 14 on the base of the facility receiving the gear motor.

The protective part includes two cowl parts 5, which are connected to one another in a formfitting manner and pressed against one another by lever latches 13. This is because the lever latches press the two cowl parts 5 against one another upon actuation of the respectively relax 13 and each contain a formfitting connection themselves.

The protective part has a circular opening toward the electric motor 11, which is bordered by an axially protruding collar. Since the protective part is assembled from the two cowl parts, which are structurally identical to one another or at least mirror symmetrical, the collar is assembled from two tube segments 20, which are, e.g., semicircular. This is because each of the cowl parts 5 has a tube segment 20, which covers 180° in the circumferential direction. The two tube segments 20 together form a tube part, in which the motor shaft, e.g., the rotor, of the electric motor 11 is received, and a radial distance is provided between the motor shaft.

Figure 3:
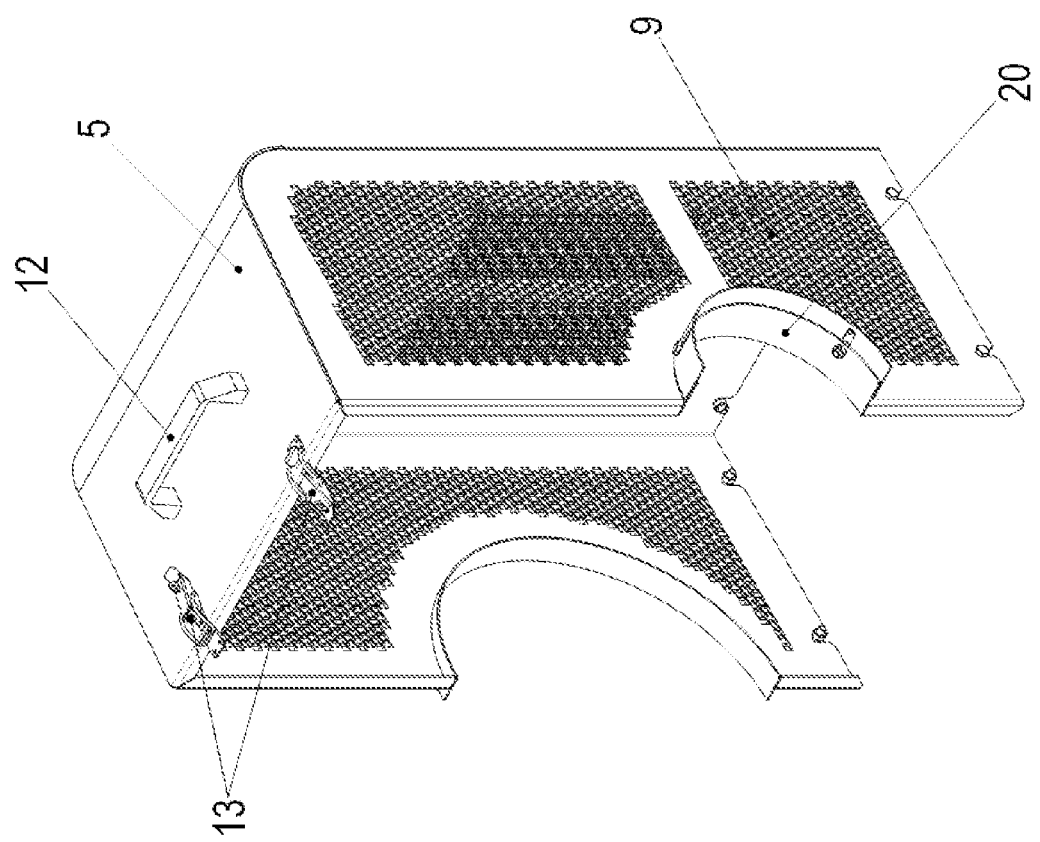
FIG. 3 is a perspective view of the cowl part 5.

As illustrated, for example, in FIG. 3, each of the tube segments 20 is axially extendable by a respective further tube segment that is pushed on and connected by screws. The screws each protrude through a first hole of the tube segment 20 and through an axially oriented oblong hole passing through the further tube segment. In this manner, the further tube segment is arranged so it is axially displaceable and can be aligned and pressed on during the installation on the housing of the electric motor 11. Only a negligible gap is thus provided between the further tube segment and the housing of the motor.

Toward the gear mechanism, the protective part includes a round opening, the clear internal diameter of which is greater than twice, e.g., greater than five times, the diameter of the driving shaft of the gear mechanism. Since the air guiding cowl 3 protrudes axially up to the protective part, only a negligible gap is thus provided between protective part and air guiding cowl 3. The airflow conveyed from the interior of the protective part into the intermediate space between the air guiding cowl 3 and the gear mechanism housing thus has no flow resistance to be taken into consideration to be overcome in the transition region. Efficient cooling is thus provided.

A handle part 12 is attached to each of the cowl parts 5, so that simple handling of the respective cowl part 5 is provided.

Each of the cowl parts 5 includes a grill on its side facing toward the motor 11 and on its side facing toward the gear mechanism, so that an airflow can be guided through the protective part. In this manner, a cooling airflow for cooling the clutch, on the one hand, and an airflow which is conveyed toward the gear mechanism 1 and is, for example, conducted through an intermediate space between an air guiding cowl 3 placed on the gear mechanism housing and the gear mechanism 1, on the other hand, are provided.

The respective door part 7 closes a recess through the respective cowl part 5, which is, for example, rectangular. A pivot bearing 8 is provided, which rotatably connects the respective door part 7 to the cowl part 5. In this manner, e.g., after removal of securing screws, a rotational movement of the door part 7 is executable, e.g., rotational folding open. However, the pivot bearing 8 is adapted to be detachable, e.g., by taking it off its hinges. For this purpose, an axially oriented displacement, e.g., oriented parallel to the rotational axis of the motor shaft or a driving shaft, and, e.g., translational, of the two parts of the pivot bearing 8 relative to one another is executable and the respective door part 7 is detachable from the cowl part 5 at the same time.

The pivot bearing 8 includes, e.g., consists of, a first and a second fitting part. The first fitting part is screwed onto the cowl part 5 by two screws. The second fitting part is screwed onto the door part 7 by two screws. The first fitting part includes a cylindrical pin, which is inserted into a corresponding pocket hole of the second fitting part. The pin is thus rotatable in the pocket hole. If the pin is pulled out in an axially oriented manner, the pivot bearing is disconnected and the door part 7 is thus separated from the cowl part 5.

The door part 7 can be opened rapidly and readily by rotational movement for an inspection of the clutch or the other components of the interior of the protective part.

For repair or maintenance, the door part 7 can be removed and/or separated from the cowl part 5 by the translational relative movement. The repair or maintenance is then readily executable because the interior is accessible without interference.

A handle part 6 is fastened on the door part 7, so that the handling of the door part 7 is executable as readily as possible.

The door part 7 includes a grill having of grill openings, so that an airflow can be exchanged as effectively as possible, thus with a low flow resistance, between interior and surroundings.

For this purpose, each of the grill openings of the grill is rectangular. The grill is arranged as a two-dimensional regular, finite grill.

The grill includes grill lines aligned parallel to one another, and each grill line includes grill openings regularly spaced apart from one another, in which the distance from a respective grill opening to the closest adjacent grill opening is a.

Each grill line includes an offset having the value a/2 in the line direction of the grill line to the closest adjacent grill line. Perpendicular to the line direction, the grill lines are spaced apart regularly from one another, e.g., also at the distance a.

The line direction is parallel to the direction of the normal of a plane spanned by the directional vector of the driven shaft 2 and by the directional vector of the driving shaft or motor shaft.

The cowl part 5 also includes such a grill on its side facing toward the motor 11, and the line direction of the grill of the cowl part 5 is aligned perpendicular to the line direction of the grill of the door part 7.

Figure 4:
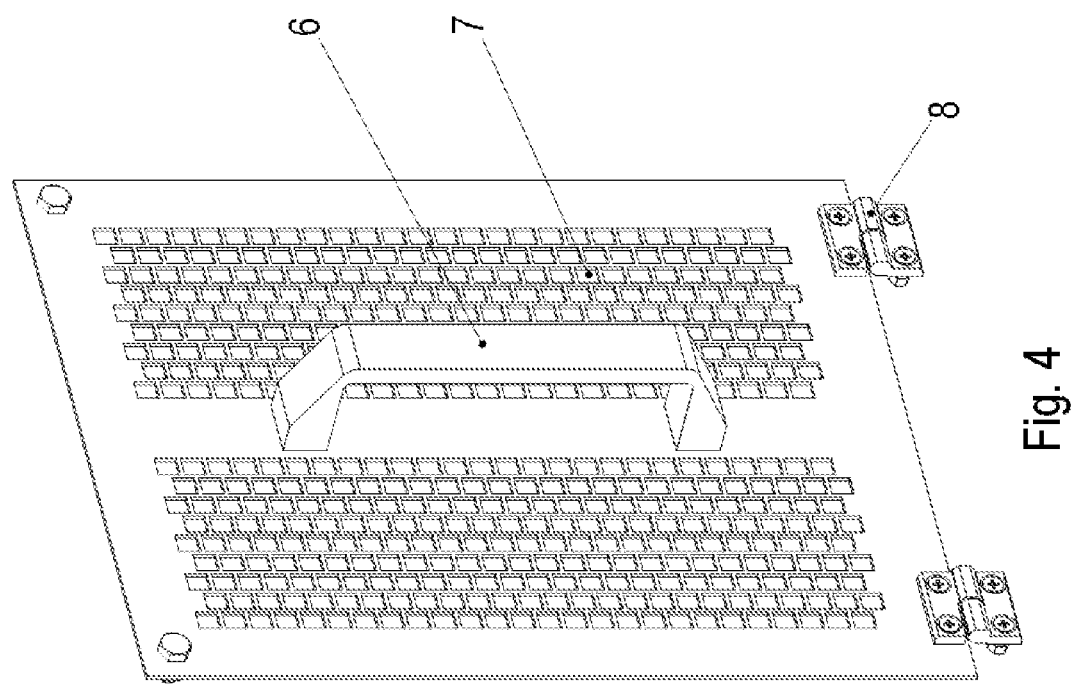
FIG. 4 is a perspective view of the door part 7.
Figure 5:
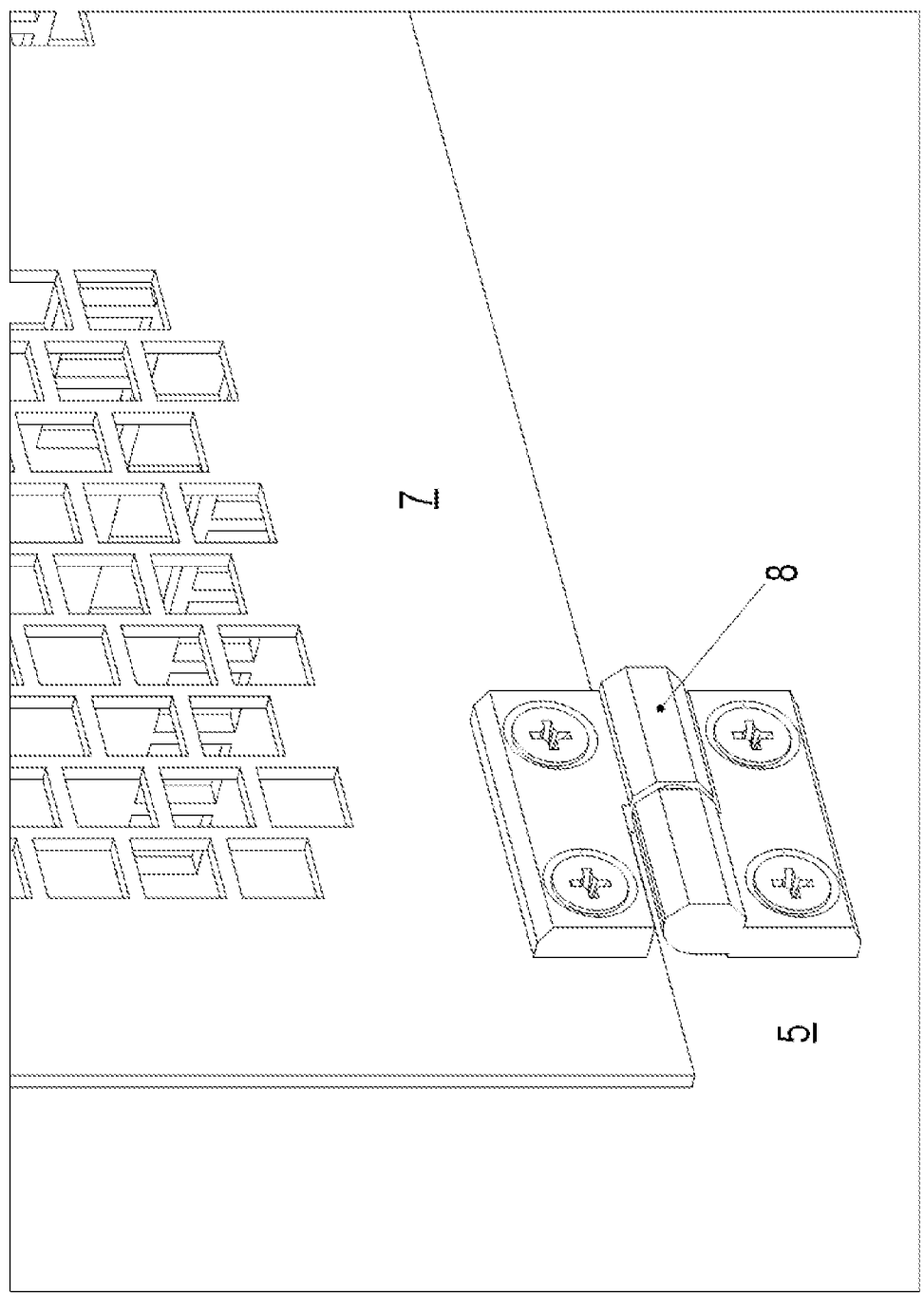
FIG. 5 is an enlarged view of the door part 7 illustrated in FIG. 4.

As illustrated in FIGS. 4 and 5, the webs between the grill openings can be made very thin and nonetheless a high stability is achievable.

Alternatively or additionally to the clutch, a fan is arranged inside the protective part. The fan is connected in a rotationally-fixed manner to the driving shaft of the gear mechanism and is thus arranged to be passive. The airflow conveyed by the fan is guided through the grill openings of the protective part at least partially into the intermediate space between the air guiding cowl 3 and the housing of the gear mechanism 1.

LIST OF REFERENCE NUMERALS 1 gear mechanism
2 driven shaft
3 air guiding cowl
4 first rocker part
5 cowl part
6 handle part
7 door part
8 detachable pivot bearing
9 grill openings
10 second rocker part
11 electric motor
12 handle part
13 lever latch
14 support
20 tube segment

The invention claimed is:

1. A gear motor, comprising:
a gear mechanism adapted to be driven via a clutch by an electric motor; and
a fan connected in a rotationally-fixed manner to a shaft of the gear mechanism;
wherein the clutch and the fan are at least partially enclosed by a protective part;
wherein the protective part includes two cowl parts; and
wherein the cowl parts are connected to one another and each cowl part includes grill openings.

2. A gear motor, comprising:
a gear mechanism adapted to be driven via a clutch by an electric motor;
wherein the clutch is at least partially enclosed by a protective part;
wherein the protective part includes two cowl parts; and
wherein the cowl parts are connected to one another and each cowl part includes grill openings on a side facing toward the electric motor.

3. A gear motor, comprising:
a gear mechanism adapted to be driven via a clutch by an electric motor;
wherein the clutch is at least partially enclosed by a protective part;
wherein the protective part includes two cowl parts;
wherein the cowl parts are connected to one another and each cowl part includes grill openings; and
wherein the two cowl parts are pressed against one another and/or are connected in a form-fitting manner by lever latches.

4. A gear motor, comprising:
a gear mechanism adapted to be driven via a clutch by an electric motor;
wherein the clutch is at least partially enclosed by a protective part;
wherein the protective part includes two cowl parts;
wherein the cowl parts are connected to one another and each cowl part includes grill openings; and
wherein a door part is connected to at least one of the cowl parts.

5. The gear motor according to claim 2, wherein a door part is connected to each of the cowl parts.

6. The gear motor according to claim 4, wherein a handle part is connected to the door part.

7. A gear motor, comprising:
a gear mechanism adapted to be driven via a clutch by an electric motor;
wherein the clutch is at least partially enclosed by a protective part;
wherein the protective part includes two cowl parts;
wherein the cowl parts are connected to one another and each cowl part includes grill openings; and
wherein a handle part is connected to the cowl part.

8. The gear motor according to claim 2, wherein a motor shaft and/or a rotor of the electric motor is arranged through a recess of the protective part into an interior enclosed by the protective part, the protective part including a collar protruding and/or axially protruding toward the electric motor and abutting the motor and/or a housing part of the motor.

9. A gear motor, comprising:
a gear mechanism adapted to be driven via a clutch by an electric motor;
wherein the clutch is at least partially enclosed by a protective part;
wherein the protective part includes two cowl parts;
wherein the cowl parts are connected to one another and each cowl part includes grill openings;
wherein a motor shaft and/or a rotor of the electric motor is arranged through a recess of the protective part into an interior enclosed by the protective part, the protective part including a collar protruding and/or axially protruding toward the electric motor and abutting the motor and/or a housing part of the motor; and
wherein the collar includes a first tube segment fastened on a first one of the cowl parts and a second tube segment, the first tube segment having a radial through hole through which a screw is arranged, the screw protruding through a through oblong hole arranged in the second tube segment.

10. The gear motor according to claim 9, wherein the collar is arranged in four parts, and the oblong hole is aligned in an axial direction.

11. The gear motor according to claim 9, wherein a circumferential angle range covered by the first tube segment in a circumferential direction is 180°.

12. The gear motor according to claim 11, wherein a circumferential angle range covered by the second tube segment in the circumferential direction is 180°.

13. The gear motor according to claim 4, wherein the door part is connected by a detachable pivot bearing to the cowl part.

14. The gear motor according to claim 13, wherein the pivot bearing includes a first fitting part, connected to the cowl part, and a second fitting part, connected to the door part, the first fitting part including a pin received and rotatable in a recess and/or a pocket hole of the second fitting part, the pin being aligned in an axial direction and/or a longest extension of the pin being aligned in the axial direction.

15. The gear motor according to claim 2, wherein the cowl parts are arranged mirror symmetrical and/or structurally identical to one another.

16. The gear motor according to claim 4, wherein a screw head of a screw passing through a recess of the door part presses the door part onto the cowl part, the screw being screwed into a threaded bore of the cowl part.

17. The gear motor according to claim 2, wherein an air guiding cowl at least partially encloses the gear mechanism, the protective part includes a recess arranged on a side facing toward the gear mechanism, arranged radially inside the air guiding cowl.

18. A gear motor, comprising:
a gear mechanism adapted to be driven via a clutch by an electric motor;
wherein the clutch is at least partially enclosed by a protective part;
wherein the protective part includes two cowl parts;
wherein the cowl parts are connected to one another and each cowl part includes grill openings;
wherein an air guiding cowl at least partially encloses the gear mechanism, the protective part includes a recess arranged on a side facing toward the gear mechanism, arranged radially inside the air guiding cowl; and
wherein a clear internal diameter of the recess is at least twice and/or at least five times a diameter of a drive shaft of the gear mechanism.

19. The gear motor according to claim 2, wherein the cowl part includes line arrangements, each line arrangement including grill openings arranged in a line and/or a straight line regularly spaced apart from one another at a distance and passing through the cowl part, the line arrangements being aligned in parallel to one another and being spaced apart regularly from one another perpendicularly to a direction of the respective line at the distance.

20. A gear motor, comprising:
a gear mechanism adapted to be driven via a clutch by an electric motor;
wherein the clutch is at least partially enclosed by a protective part;
wherein the protective part includes two cowl parts;
wherein the cowl parts are connected to one another and each cowl part includes grill openings;
wherein the cowl part includes line arrangements, each line arrangement including grill openings arranged in a line and/or a straight line regularly spaced apart from one another at a distance and passing through the cowl part, the line arrangements being aligned in parallel to one another and being spaced apart regularly from one another perpendicularly to a direction of the respective line at the distance; and
wherein each line arrangement has an offset in relation to a respective closest adjacent line arrangement, and the grill openings are rectangular.

21. The gear motor according to claim 20, wherein the offset is half of the distance.

22. The gear motor according to claim 4, wherein the door part includes line arrangements, each line arrangement including grill openings arranged in a line and/or a straight line regularly spaced apart from one another at a distance and passing through the door part, the line arrangements being aligned in parallel to one another and being spaced apart regularly from one another perpendicularly to a direction of the respective line at the distance.

23. The gear motor according to claim 22, wherein each line arrangement has an offset in relation to a respective closest adjacent line arrangement, and the grill openings are rectangular.

24. The gear motor according to claim 23, wherein the offset is half of the distance.

* * * * *